April 30, 1940.  P. T. SPRAGUE ET AL  2,199,013
PRESSURE GAUGE
Filed May 22, 1937    2 Sheets-Sheet 1

INVENTORS.
PHILIP T. SPRAGUE.
ARNOLD SOLLER.
BY
ATTORNEYS.

April 30, 1940. P. T. SPRAGUE ET AL 2,199,013
PRESSURE GAUGE
Filed May 22, 1937 2 Sheets-Sheet 2

PHILIP T. SPRAGUE.
ARNOLD SOLLER.
INVENTORS

BY Altsch + Knoblock.
ATTORNEY.

Patented Apr. 30, 1940

2,199,013

UNITED STATES PATENT OFFICE 2,199,013

PRESSURE GAUGE

Philip T. Sprague and Arnold Soller, Michigan City, Ind., assignors to The Hays Corporation, Michigan City, Ind.

Application May 22, 1937, Serial No. 144,128

2 Claims. (Cl. 73—110)

This invention relates to improvements in pressure gauges, and particularly to gauges employed for the measurement of pressures which vary according to a square root function.

In gauges, such as flow indicators, and the like, wherein the result to be indicated or recorded depends upon a square root function, the spacing of the indicia on a scale is usually unequal by reason of the presence of the square root function. Therefore, it becomes difficult to provide a scale wherein scale indications for the lower range of movement are sufficiently clear without causing a very great spacing of the indicia at the upper range of movement with consequent objectionable over-size of the scale. It is therefore the primary object of this invention to provide an instrument of this character with novel means for compensating for a square root factor in a manner to permit use of substantially uniformly spaced indicia on a scale.

A further object is to provide a device of this character wherein a coil spring is connected at its opposite ends to a fixed member and to the free end of a pivoted lever whereby it normally aligns said lever with said spring, and whereby pivoting of said lever progressively increases the tension of said spring.

A further object is to provide a device of this character having an extensible calibrating spring, with indicator actuating means including a pivoted lever whose free end is connected to said spring to be normally aligned therewith, pivoting of said lever progressively extending said spring.

Other objects will be apparent from the description and the appended claims.

Figure 1:
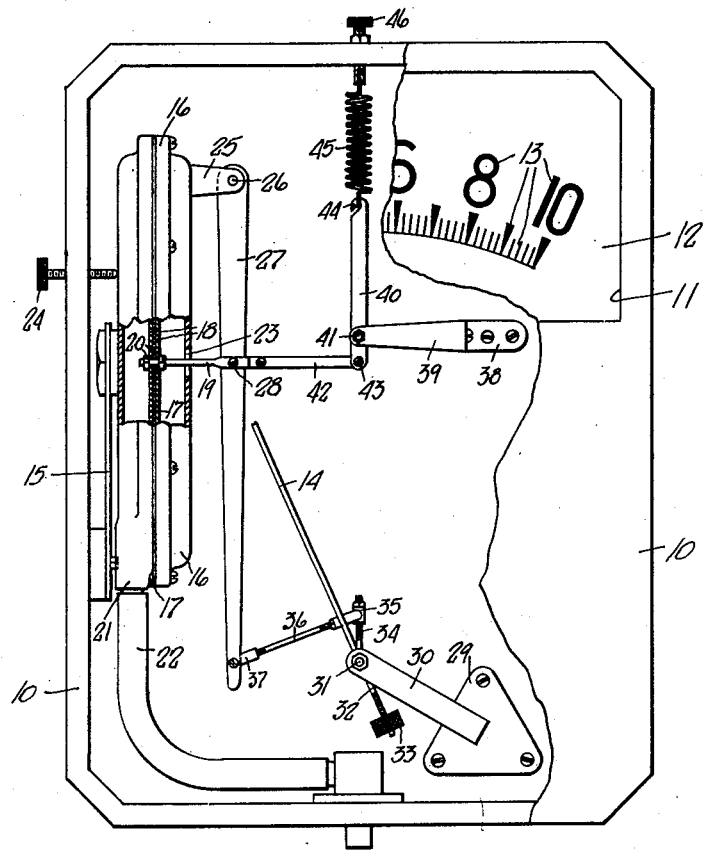
Fig. 1 is a face view, with parts broken away, illustrating my invention applied to a pointer gauge for flow indication.
Figure 3:
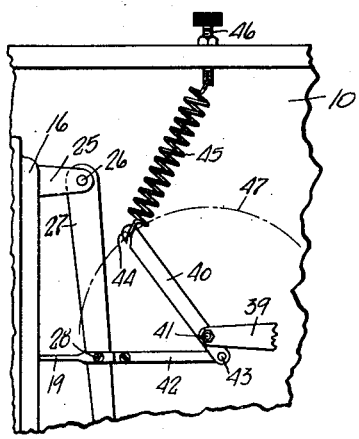
Fig. 3 is a fragmentary detail view illustrating the calibrating spring in extended position.
Figure 2:
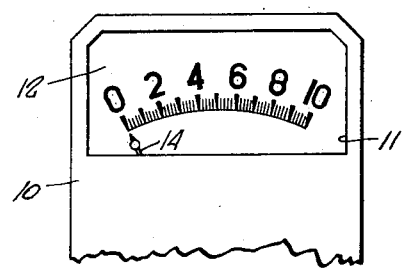
Fig. 2 is a fragmentary face view of pointer gauge for flow indication illustrating the substantially equally spaced scale characters.

Referring to the drawings, which illustrates the preferred embodiment of my invention, numeral 10 designates a casing having a sight opening 11 exposing the instrument scale 12 having substantially equally spaced indicia 13 throughout its entire range, and a pointer 14 juxtaposed to the indicia of the scale.

Within casing 10, and preferably at one of the side walls thereof is secured one end of a flat elongated spring 15 whose opposite end rigidly mounts a two part diaphragm housing 16 at the center of said housing. A suitable diaphragm 17 of highly flexible leather, treated fabric or the like is clamped between the parts of housing 16 in slack relation, and at the center of this diaphragm on opposite sides thereof are disposed thin rigid plates 18 which are clamped together by an arm 19 extending therethrough and through the diaphragm and whose end is threaded to receive nuts 20 bearing on opposite plates 18. One part of diaphragm housing 16 has an inlet 21 for connection with a conduit 22 adapted for connection with the source of pressure to be measured by the instrument. The other part of housing 16 has an opening 23 therein, preferably centrally thereof to accommodate passage of arm 19 exteriorly of the housing. Thus the compartments in the housing separated by the diaphragm are respectively subject to the pressure to be measured, and atmospheric pressure. In spaced relation to the spring 15 and preferably aligned therewith is a zero adjustment screw 24 threaded in the side wall of casing 10 to which spring 15 is connected and bearing against housing 16 at its inner end to position said housing in casing 10 against the action of the mounting spring 15 therefor.

From the inner face of housing 16, preferably adjacent the upper end thereof, projects a horizontal arm 25 to which is pivoted at 26 one end of an elongated rigid arm 27 which is normally substantially vertically positioned and whose lower end preferably terminates adjacent or below the bottom of housing 16. Arm 19 is pivotally connected with arm 27 at 28 opposite the center of housing 16.

A bracket 29 is secured to the rear wall of casing 10 at the lower end thereof and includes an elongated arm 30 to which the lower end of pointer arm 14 is pivoted at 31 substantially centrally between the side walls of casing 10. Pointer arm 14 includes a threaded portion 32 below said pivot on which a counterweight 33 is adjustably mounted. A threaded member 34 in fixed relation to pointer arm 14 projects upwardly from said pivot point and adjustably mounts a pivot connector 35 which mounts one end of a link 36. The other end of link 36 is pivotally connected to the lower end of arm 27 at 37.

A bracket 38 is fixedly carried by the rear wall of casing 10 slightly above the level of the center of diaphragm housing 16, and includes an elongated arm 39. A lever 40 is pivoted to arm 39 at 41 adjacent the lower end of said lever and substantially centrally between the side walls of casing 10. An extension 42 of arm 19 is pivoted to the lever 40 at 43 in closely spaced relation below pivot 41 of said lever. The upper end of arm 40 includes a hook portion 44 for connection with the lower end of a coil spring 45. A calibration adjusting screw 46 is threaded in the top of casing 10 in vertical alignment with pivot 41 and is provided at its lower end with a suitable aperture for connection of the upper end of spring 45 therewith.

The operation of the device is as follows: The instrument is first adjusted to insure proper positioning of pointer 14 relative to the zero indicia 13 on scale 12, by adjusting the position of the housing 16 on its mounting spring 15 by means of zero adjustment screw 24 while the opposed compartments of said diaphragm housing are both open to atmosphere. The device is then adjusted for its calibration by adjusting calibration adjustment screw 46 to increase or decrease the tension on spring 45 to control the position of pointer 14 while a pressure of known value is supplied to the diaphragm housing through conduit 22. The device is now ready for use.

As pressure to be measured is supplied to the diaphragm casing 16 through conduit 22, the same acts upon diaphragm 17 to longitudinally shift arm 19 and its extension 42. This movement of arm 19 pivots elongated arm 27 to pivot pointer 14 through link 36 and member 34. At the same time, the movement of extension 42 pivots lever 40 whereby the hook portion 44 thereof to which spring 45 is connected travels in arc 47, thereby breaking the normal alignment of said lever 40 and spring 45 with the lever pivot 41 and calibration adjustment screw 46. The breaking of this normal alignment of parts causes the spring 45 to be extended and tensioned until the increase of tension counterbalances the pressure applied to diaphragm 17 through conduit 22 and thereby holds the pointer 14 stationary at a point on scale 12 which designates the value of the pressure applied.

It will be observed that initial pivoting of lever 40 involves principally a horizontal movement, with but a very slight downward component. This causes only a comparatively small extension of the spring. However, as the pivoting of said lever 40 continues, the downward component of movement rapidly increases, with resultant geometric progression of the increase of tension of spring 45. It has been found that the progressive increase of tension with this arrangement of parts is substantially equivalent to the geometric progression of the square of successive values, in the range between vertical and horizontal positions of lever 40. Therefore, spring 45 automatically prevents movement of pointer 14 a greater distance between any two points on the scale having a predetermined difference in pressure value than between any other two points on the scale having the same difference in pressure value. For instance, pointer movement from 0 to 2 is no greater than the movement thereof from 7 to 9, even though the difference of the squared values of said respective pressures is very great. In other words, the instant device compensates for the square root function in a manner which permits equal scale divisions to be used. This increases the sensitivity of the instrument at the lower range of pressures to substantial equality with its sensitivity at the high range of pressures, though it will be understood that the accuracy of the instrument in the extremely low pressure range is not quite so great as in the higher ranges where a more substantial downward component of movement of hook 44 is obtained. Obviously, a further advantage is the reduction in scale size provided, as compared with the size of scales having unequal scale markings.

Figure 4:
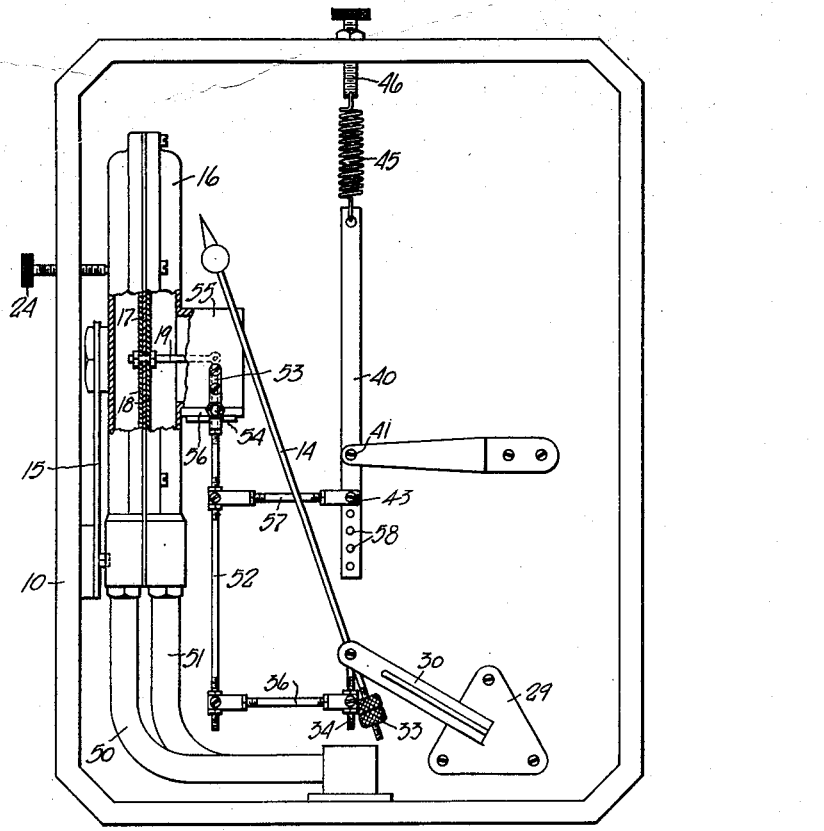
Fig. 4 is a face view, with parts broken away, illustrating my invention applied to a pointer gauge for differential flow indication.

The construction illustrated in Fig. 4 is in all respects similar to that heretofore described, except that the diaphragm unit therein is responsive to and measures differences in two applied pressures. In other words, both of the diaphragm-separated compartments of housing 16 are sealed, and each is provided with an inlet to which conduits 50 and 51 for connection with sources of differential pressure are respectively connected. The pressure operated pivoted arm 52 of this differential pressure unit is conventional, the same being mounted on a bracket 53 pivoted at 54 to an extension 55 at one side of housing 16, and said arm 52 passing into extension 55 through a suitable stuffing box 56 for connection with arm 19 secured to plates 18 on opposite sides of diaphragm 17. This construction necessitates use of a link 57 pivoted to arm 52 adjacent bracket 53 and in turn connected to lever 40. Lever 40 and its associated parts are proportioned to compensate for the lowering of the pivot connection of link 57 therewith. If desired, the portion of lever 40 below its pivot 41 may be provided with a plurality of longitudinally spaced apertures 58 for adjustable positioning of the pivot 43 of link 57 relative to the pivot center 41 of the lever to compensate for the range of pointer movement per unit of pressure measured by the diaphragm unit.

We claim:

1. In combination, a housing, a pressure responsive member within said housing, an elongated pivoted arm actuated by said member, an indicator pivoted in said housing, a link connecting said arm and indicator, a lever pivoted intermediate its ends in said housing, a link connecting said arm and lever, and an extensible spring aligned with said lever and connected at one end with said lever opposite said link and at its other end with said housing for progressively dampening the rate of actuation of said arm by said member and thereby controlling movement of said indicator.

2. The combination defined in claim 1, wherein the last named end of said spring is connected to a member adjustable in said housing and projecting exteriorly thereof.

PHILIP T. SPRAGUE.
ARNOLD SOLLER.